United States Patent
Yamamoto et al.

(10) Patent No.: US 12,500,790 B2
(45) Date of Patent: Dec. 16, 2025

(54) OPERATION SWITCH AND DEVICE LINKAGE SYSTEM

(71) Applicant: Panasonic Intellectual Property Management Co., Ltd., Osaka (JP)

(72) Inventors: Yuka Yamamoto, Osaka (JP); Ryo Kawamura, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 683 days.

(21) Appl. No.: 17/995,558

(22) PCT Filed: Apr. 7, 2021

(86) PCT No.: PCT/JP2021/014775
§ 371 (c)(1),
(2) Date: Oct. 5, 2022

(87) PCT Pub. No.: WO2021/215251
PCT Pub. Date: Oct. 28, 2021

(65) Prior Publication Data
US 2023/0155856 A1 May 18, 2023

(30) Foreign Application Priority Data
Apr. 23, 2020 (JP) .................. 2020-076960

(51) Int. Cl.
*H04L 12/28* (2006.01)
*G05B 19/042* (2006.01)
*H01H 13/14* (2006.01)

(52) U.S. Cl.
CPC .......... *H04L 12/282* (2013.01); *G05B 19/042* (2013.01); *H01H 13/14* (2013.01); *G05B 2219/2642* (2013.01)

(58) Field of Classification Search
CPC ............... H04L 12/282; G05B 19/042; G05B 2219/2642; H01H 13/14; H04Q 9/00
See application file for complete search history.

(56) References Cited

U.S. PATENT DOCUMENTS 5,428,342 A * 6/1995 Enoki ............... G08B 21/0484
340/12.32
2015/0296276 A1* 10/2015 Umetani .................. H04Q 9/00
340/870.07

(Continued)

FOREIGN PATENT DOCUMENTS

| JP | 60-209835 A | 10/1985 |
| JP | 04-324372 A | 11/1992 |
| JP | 07-204183 A | 8/1995 |

(Continued)

OTHER PUBLICATIONS

International Search Report issued on Jul. 13, 2021 in International Patent Application No. PCT/JP2021/014775, with English translation.

*Primary Examiner* — Ziaul Karim
(74) *Attorney, Agent, or Firm* — Rimon P.C.

(57) ABSTRACT

An operation switch for operating a device includes: a switch button to be pressed by a user; and a controller that causes a notifier to give a notification that prompts pressing of the switch button at a preset time, and operates the device in response to pressing of the switch button after the notifier gives the notification.

12 Claims, 10 Drawing Sheets

(56) References Cited

U.S. PATENT DOCUMENTS

2018/0173409 A1* 6/2018 Usuki .................... G05B 15/02
2021/0386895 A1* 12/2021 Ahn ....................... A61B 90/70

FOREIGN PATENT DOCUMENTS

| | | |
|---|---|---|
| JP | 2002-191080 A | 7/2002 |
| JP | 2005-284535 A | 10/2005 |
| JP | 2013-000287 A | 1/2013 |
| JP | 2013-073673 A | 4/2013 |
| JP | 2017-005628 A | 1/2017 |
| JP | 2018-055293 A | 4/2018 |
| WO | 2014/049948 A1 | 4/2014 |
| WO | 2016/203755 A1 | 12/2016 |

* cited by examiner

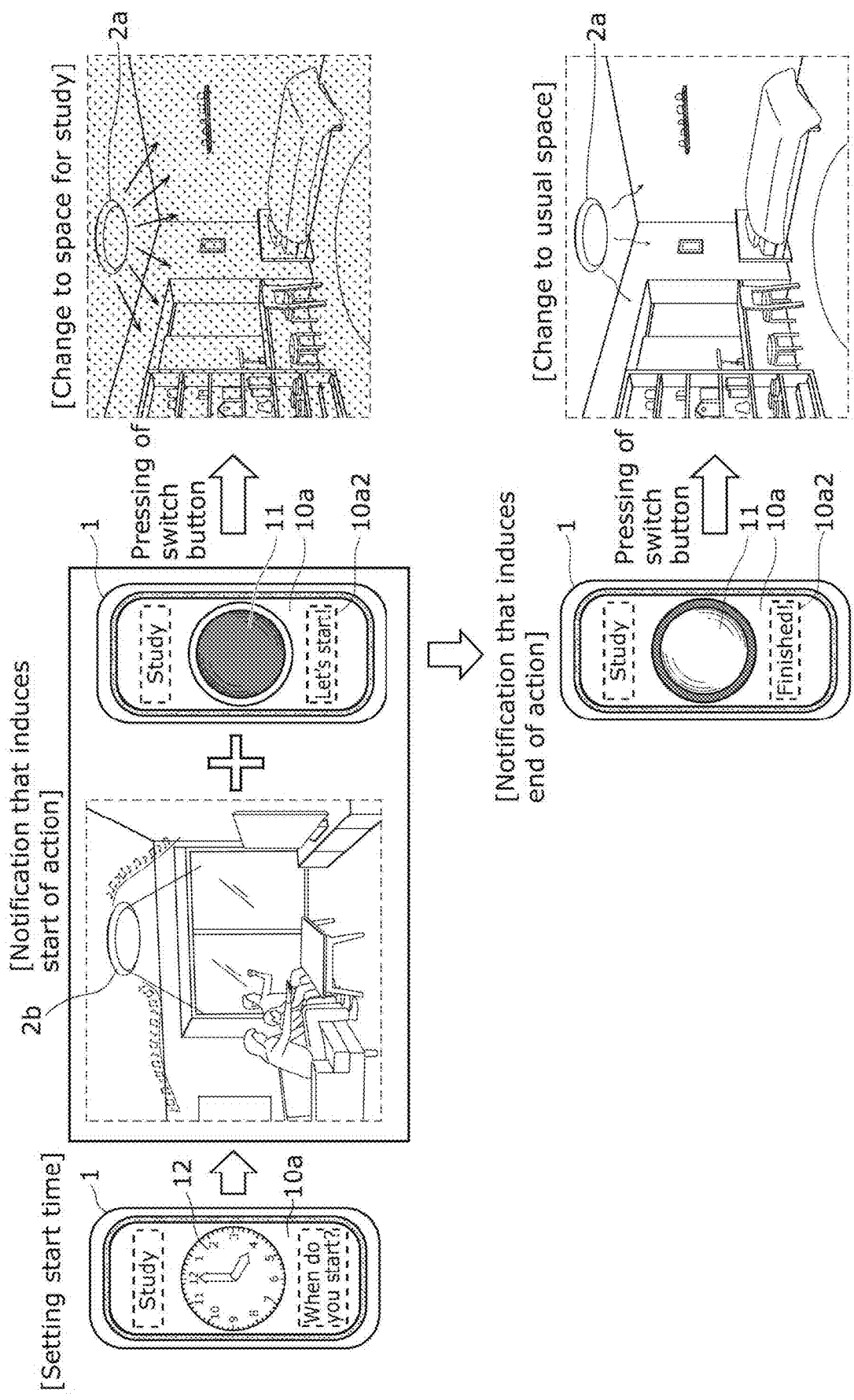

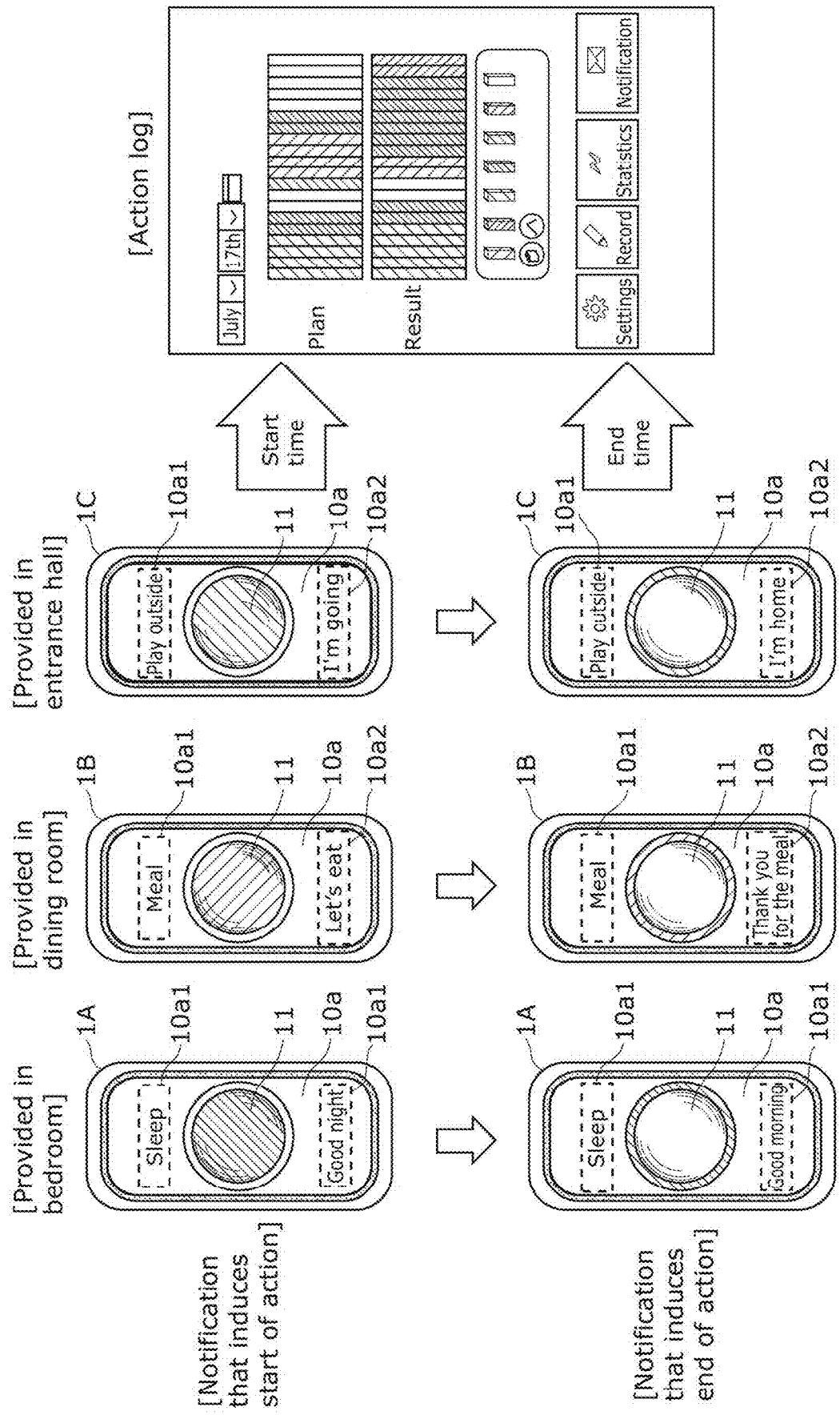

OPERATION SWITCH AND DEVICE LINKAGE SYSTEM

CROSS-REFERENCE OF RELATED APPLICATIONS

This application is the U.S. National Phase under 35 U.S.C. § 371 of International Patent Application No. PCT/JP2021/014775, filed on Apr. 7, 2021, which in turn claims the benefit of Japanese Patent Application No. 2020-076960, filed on Apr. 23, 2020, the entire disclosures of which applications are incorporated by reference herein.

TECHNICAL FIELD

The present invention relates to an operation switch and a device linkage system including the operation switch.

BACKGROUND ART

Devices, such as home appliances, perform predetermined operations by being operated by a user. When a user operates such a device, the user can use a remote controller as an operation switch for operating the device to operate the device wirelessly and cause the device to operate, even at a location away from the device.

For example, a technique of operating a device, such as a lighting fixture, an air conditioner, or a television by using an infrared remote controller (e.g., Patent Literature (PTL) 1) has been known. PTL 1 discloses turning on and off a lighting fixture and dimming the light and adjusting the color of the light to be emitted from the lighting fixture by using an infrared remote controller. A technique also has been known in which a mobile terminal such as a smart phone is used as a remote controller and remotely operating a device located indoors from outdoors.

CITATION LIST

Patent Literature

[PTL 1] Japanese Unexamined Patent Application Publication No. 2013-73673

SUMMARY OF INVENTION

Technical Problem

In recent years, an operational log is obtained from a device to know actions of a user. Such an operational log indicates times at which the user has operated the device and what operations have been performed on the device.

In such a case, the operational log of the device may be obtained by using a function that causes the device to start operating automatically at a time preset by the user (operation timer function). However, whether the user voluntarily takes action and actually operates the device cannot be known with only such an operation timer function.

Moreover, in order to cause the user to voluntarily operate the device, an alarm function of a mobile terminal or a clock may be used to give an alarm sound at a time set by the user to prompt the user to operate the device. However, the user does not always operate the device when the user turns off the alarm sound that is given. For example, the user may only turn off the given alarm sound and forget to operate the device. Therefore, it is difficult to cause the user to operate the device and obtain an operational log by using only the alarm function of a mobile terminal or a clock.

The present invention has been conceived to solve such problems, and aims to provide an operation switch and a device linkage system that enable a user to voluntarily operate a device to cause the device to start operating by prompting the user to operate the device at a time set by the user.

Solution to Problem

In order to achieve the above, an operation switch according to an aspect of the present invention is an operation switch for operating a first device. The operation switch includes: a switch button to be pressed by a user; and a controller that causes a notifier to give a notification that prompts pressing of the switch button at a preset time, and operates the first device in response to pressing of the switch button after the notifier gives the notification.

Moreover, a device linkage system according to an aspect of the present invention includes: a first device provided in a predetermined space; and an operation switch that operates the first device. The operation switch includes: a switch button to be pressed by a user; and a controller that causes a notifier to give a notification that prompts pressing of the switch button at a preset time, and operates the first device to change an environment of the predetermined space in response to pressing of the switch button after the notifier gives the notification.

Advantageous Effects of Invention

The present invention enables a user to voluntarily operate a device to cause the device to start operating by prompting the user to operate the device at a time set by the user.

BRIEF DESCRIPTION OF DRAWINGS

FIG. 10 is a diagram for illustrating linkage of an operation switch in a device linkage system according to Variation 1 with a first device and a second device.

FIG. 11 is a diagram for illustrating an exemplary use when a plurality of operation switches are used.

DESCRIPTION OF EMBODIMENTS

Hereinafter, an embodiment of the present invention will be described. It is to be noted that each embodiment described below shows a specific preferred example of the present invention. Therefore, the numerical values, shapes, materials, structural elements, the arrangement and connection of the structural elements, and so on indicated in the following embodiments are mere examples, and are not intended to limit the present invention. Therefore, among the structural elements in the following embodiments, structural elements not recited in any of the independent claims defining the most generic concept of the present invention are described as optional structural elements.

Each diagram is a schematic diagram and is not necessarily illustrated precisely. In each diagram, the configurations that are essentially the same share like reference signs, and overlapping description may be omitted or simplified.

EMBODIMENT

Figure 1:
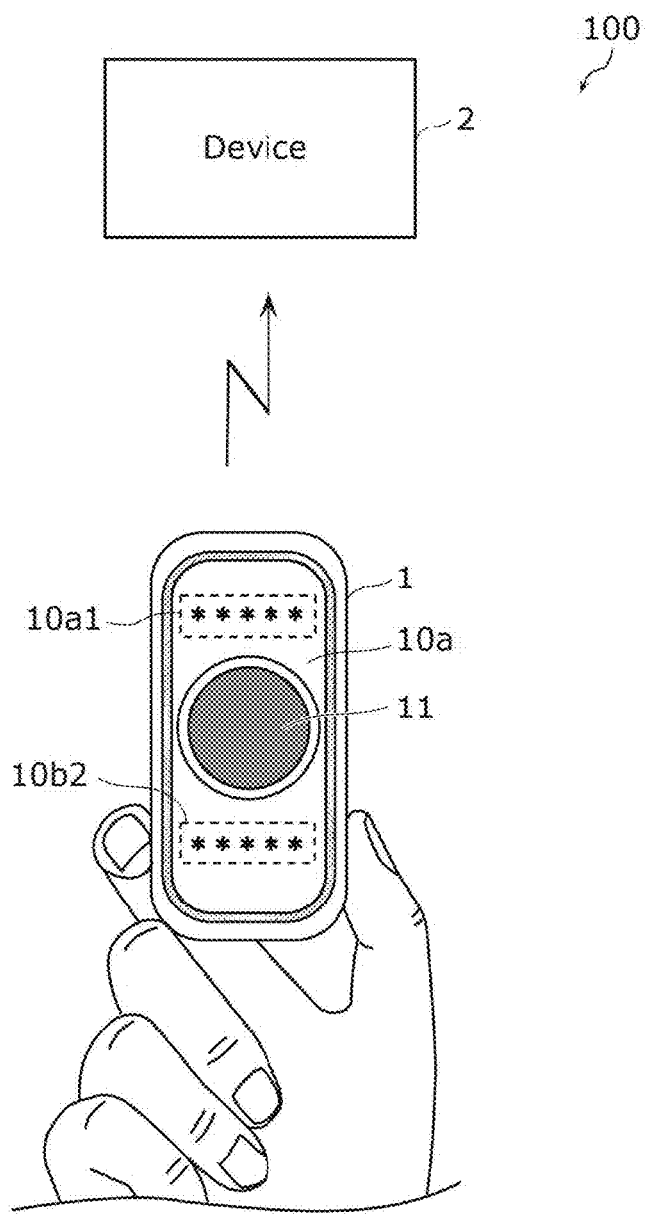
FIG. 1 is a diagram illustrating a configuration of a device linkage system according to an embodiment.
Figure 2:
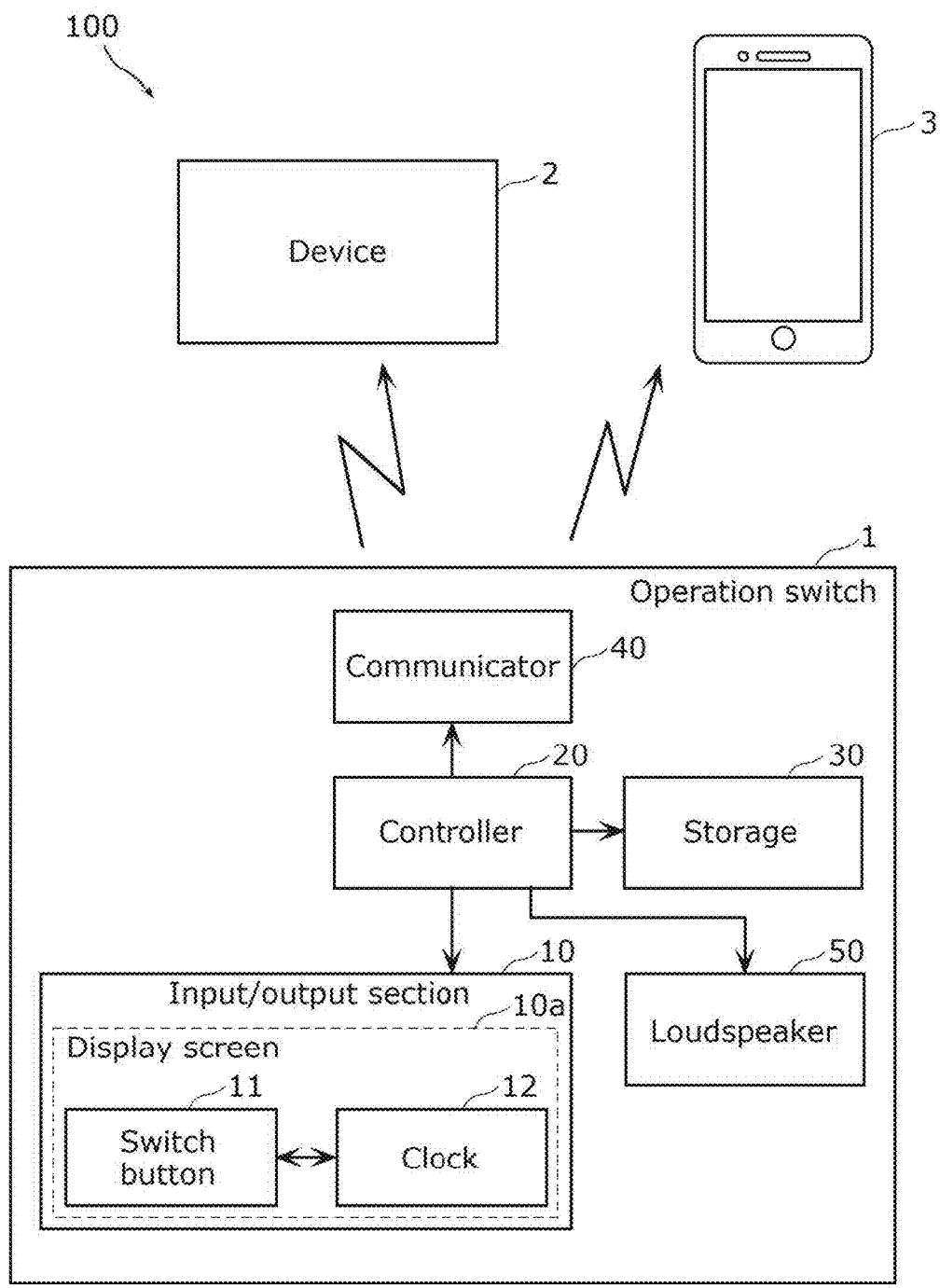
FIG. 2 is a block diagram illustrating the configuration of the device linkage system according to the embodiment.

First, operation switch 1 and device linkage system 100 according to an embodiment will be described with reference to FIGS. 1 and 2. FIG. 1 is a diagram illustrating a configuration of device linkage system 100 according to the embodiment. FIG. 2 is a block diagram illustrating the configuration of device linkage system 100.

As illustrated in FIGS. 1 and 2, device linkage system 100 includes operation switch 1 and device 2 to be operated by operation switch 1. As illustrated in FIG. 2, device linkage system 100 may further include information processing device 3.

Operation switch 1 is an operation terminal for controlling device 2. Operation switch 1 and device 2 are communicably connected to each other through wireless communication. Operation switch 1 causes device 2 to operate by remotely controlling device 2. When operation switch 1 is operated by a user, a main function and an auxiliary function, which are operation specifications of device 2, will operate. For example, when the user operates operation switch 1, the user can switch between on and off of the main function and the auxiliary function of device 2, or control the main function and the auxiliary function of device 2.

Moreover, operation switch 1 not only includes the function of operating device 2, but also includes a function that causes a notifier to give a notification that prompts pressing of switch button 11 of operation switch 1. In this embodiment, the notification that prompts pressing of switch button 11 is given when a predetermined action (act) is desired to be started by the user. Moreover, the notification that prompts pressing of switch button 11 may be given when the user has finished the predetermined action. In other words, the notification that prompts the user to press switch button 11 is a notification that prompts pressing of switch button 11 and induces the user to start the predetermined action (hereafter, also referred to as a "notification that induces start of an action"), or a notification that prompts pressing of switch button 11 when the user has finished the predetermined action (hereafter, also referred to as a "notification that induces end of an action").

Operation switch 1 further includes a function of setting a time at which the user is to start a predetermined action (start time), a function that causes the notifier to give a notification that induces start of an action at the start time that is set, and a function that causes the notifier to give a notification that induces end of an action when switch button 11 is pressed after the notification that induces start of an action is given. The details will be described later.

When switch button 11 is pressed, device 2 starts or ends a predetermined operation. In other words, switch button 11 is a selecting switch for switching between start and end of a predetermined operation of device 2.

Note that operation switch 1 is also communicably connected to information processing device 3 through wireless communication. For example, information processing device 3 is a mobile terminal, such as a smartphone, but may be a non-mobile terminal, such as a stationary personal computer.

Device 2 is a device that performs a predetermined operation by being operated by operation switch 1. Device 2 is, for example, a home appliance or housing equipment provided in a building or a facility. Examples of a home appliance include a lighting device such as a lighting fixture, air conditioning device such as an air conditioner, video device such as a television and Blu-ray Disc (BD) (registered trademark) recorder, an audio device such as audio equipment and a loudspeaker, or an aromatic device such as an aroma diffuser. Moreover, examples of the housing equipment include equipment where water is used, such as a bathroom, a toilet, a kitchen, a water heater; or air conditioning equipment such as a ventilation system. Note that device 2 is not limited the above-described devices and may be any device that performs a predetermined operation by being operated by operation switch 1. Device 2 may be a device that can obtain an action log of a person. Moreover, device 2 may be used as a first device and a second device different from the first device may be provided.

Device 2 is provided in a predetermined space. In this case, device 2 may be provided indoors, such as in a room in a building, or may be provided outdoors. In other words, the predetermined space in which device 2 is provided may be an indoor space or an outdoor space.

In this embodiment, device 2 is a lighting fixture, such as a ceiling light, a downlight, a spotlight, or an indirect lighting fixture. Device 2 is provided, for example, on the ceiling, the floor, or a wall of a room in a home. As a lighting fixture, for example, a light-emitting diode (LED) light having an LED light source may be used, but this example is not limiting.

Figure 3:
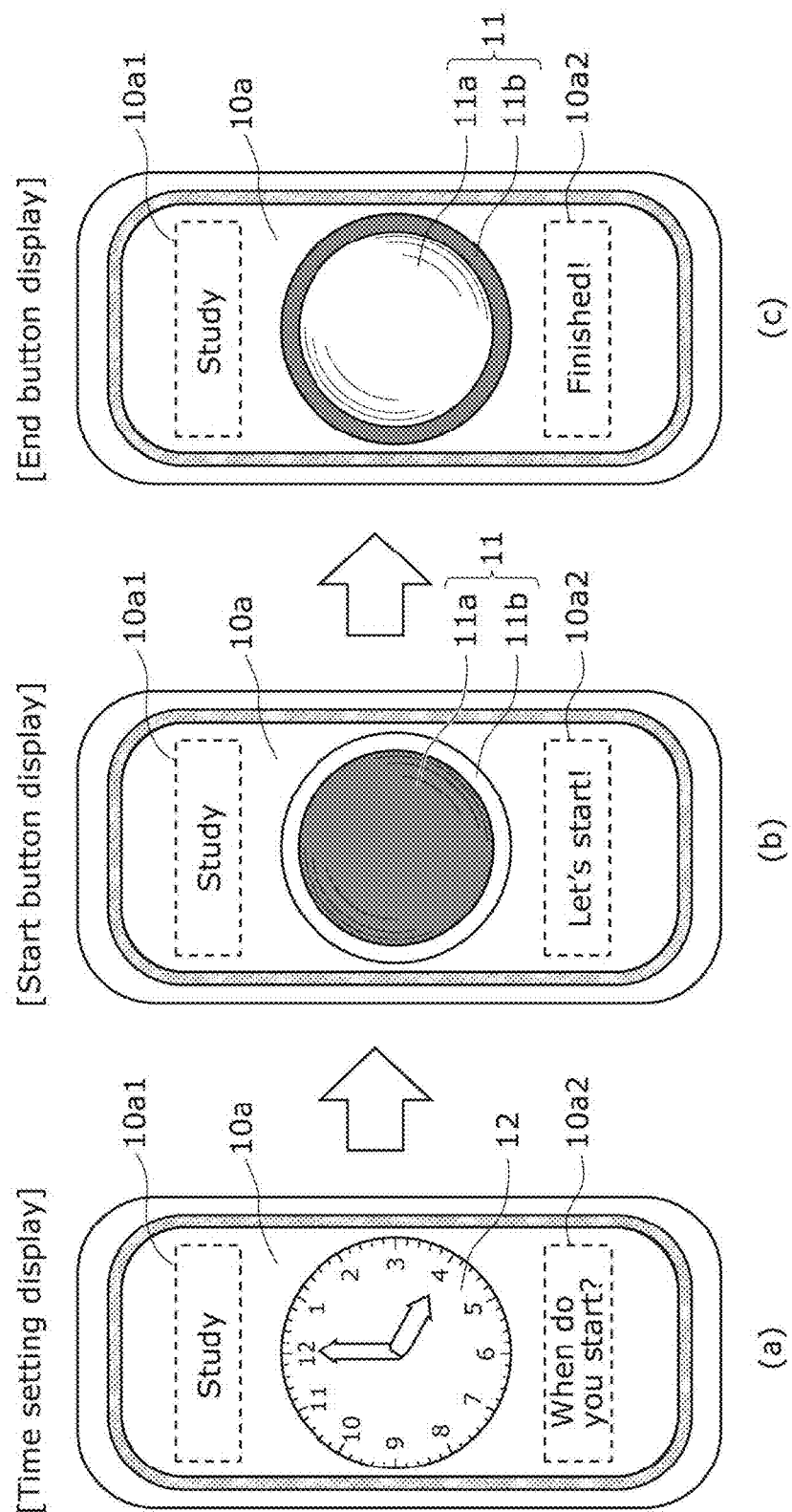
FIG. 3 is a diagram illustrating an example of a display on the screen of an operation switch according to the embodiment.

Next, a configuration of operation switch 1 will be described with reference to FIG. 3 as well as FIG. 2. FIG. 3 is a diagram illustrating an example of a display on the screen of operation switch 1 according to the embodiment. FIG. 3 illustrates a case where a user is to study as the predetermined action.

As illustrated in FIG. 2, operation switch 1 includes input/output section 10, controller 20, storage 30, communicator 40, and loudspeaker 50.

Input/output section 10 is a user interface, and has both (i) an input function that receives an input (e.g., operation) from a user and (ii) an output function that outputs information such as an image and text, or a result of processing by controller 20.

In this embodiment, input/output section 10 has a touch function as the input function, and has a display function as the output function. Specifically, input/output section 10 includes display screen 10a. Display screen 10a serves as both an input screen that implements the touch function and an output screen that implements the display function. For example, input/output section 10 is a touch panel including display screen 10a, and has both the touch function and the display function. On display screen 10a of input/output section 10, which is a touch panel, a graphical user interface (GUI) image suitable for touch operation by a user is displayed. Specifically, input/output section 10 is a display device having the touch function, and includes display screen 10a. For example, input/output section 10 includes a liquid crystal display panel or an organic electroluminescence (EL) display panel.

Note that, in this embodiment, input/output section 10 having both the input function and the output function is used, but this is not limiting. The input function and the output function may be implemented by a device having an input function and another device having an output function. In this case, as an input section having the input function, for example, switch button 11 does not need to be an image, and may be a mechanical switch button. Moreover, when the input function and the output function are implemented by a device having the input function and another device having the output function, the device having the output function may be a liquid crystal display panel or an organic electroluminescence (EL) display panel having only the display function among the touch function and the display function.

As illustrated in FIG. 2, and (b) and (c) in FIG. 3, switch button 11 is displayed on display screen 10a as an input image. In other words, switch button 11 according to this embodiment is an image that looks like a three-dimensional switch button. Accordingly, operation switch 1 is a smart switch that includes switch button 11 displayed as an image and controlling a predetermined operation of device 2.

As illustrated in (b) and (c) in FIG. 3, switch button 11 includes circular section 11a and ring section 11b. Ring section 11b surrounds circular section 11a. Circular section 11a and ring section 11b are displayed in different colors, but may be displayed in the same color.

Moreover, as illustrated in FIG. 2 and (a) in FIG. 3, clock 12 is displayed on display screen 10a as an input image. In other words, clock 12 is a clock image for setting a time by a user. Specifically, clock 12 is an input image for inputting a time at which a notification that prompts the user to press switch button 11 is given. Accordingly, operation switch 1 includes input/output section 10 as an input section for inputting a time at which pressing of switch button 11 is to be prompted.

The image of each of switch button 11 and clock 12 is displayed on display screen 10a when necessary. In this embodiment, when switch button 11 is displayed on display screen 10a, clock 12 is not displayed on display screen 10a. On the other hand, when clock 12 is displayed on display screen 10a, switch button 11 is not displayed on display screen 10a. Specifically, as illustrated in FIG. 3, switch button 11 and clock 12 have circular shapes and their external shapes are in the same size. Switch button 11 and clock 12 are switched at the same position on display screen 10a so that switch button 11 or clock 12 is displayed at the same position. Note that switch button 11 and clock 12 may be displayed on display screen 10a simultaneously.

As an example, a large image of switch button 11 and a large image of clock 12 are displayed in a center portion of display screen 10a. With this, the user can easily touch and press switch button 11, and easily set a time using clock 12.

As illustrated in FIG. 3, display screen 10a includes first text display area 10a1 and second text display area 10a2. In this embodiment, first text display area 10a1 is an area located above the area where switch button 11 and clock 12 are displayed. Second text display area 10a2 is an area located below the area where switch button 11 and clock 12 are displayed on display screen 10a.

In first text display area 10a1, text that describes a name of a predetermined action to be performed by the user is displayed. For example, when the user is to study as the predetermined action, the text "Study" is displayed in first text display area 10a1 as illustrated in FIG. 3.

In second text display area 10a2, text is displayed that relates to the predetermined action by the user displayed in first text display area 10a1.

Specifically, when the user sets a time at which the predetermined action is to be started, as illustrated in (a) in FIG. 3, operation switch 1 turns into a time setting display mode in which clock 12 is displayed on display screen 10a and text that prompts inputting of a time at which the predetermined action is to be started is displayed in second text display area 10a2. For example, when the user is to study as the predetermined action, as the text that prompts inputting of a time at which studying is to be started, "When do you start?" is displayed in second text display area 10a2.

Moreover, in second text display area 10a2, text that relates to the predetermined action to be performed by the user displayed in first text display area 10a1 and that prompts the user to press switch button 11 is displayed. A notification that prompts pressing of switch button 11 is given by displaying the text that prompts the user to press switch button 11 in second text display area 10a2. In other words, in this embodiment, input/output section 10 also functions as a notifier that gives a notification that prompts pressing of switch button 11. Specifically, input/output section 10 gives a notification by outputting the notification as the text that prompts pressing of switch button 11. Accordingly, the notifier that gives a notification that prompts pressing of switch button 11 is a display in this embodiment, and a notification that prompts pressing of switch button 11 is displayed as text in second text display area 10a2 of display screen 10a.

As described above, a notification that prompts pressing of switch button 11 is a notification that induces start of an action or a notification that induces end of an action. Therefore, text that induces the user to start the predetermined action or text that induces the user to operate operation switch 1 when the user has finished the predetermined action is displayed in second text display area 10a2. In other words, in second text display area 10a2, for example, text that describes a message to be used when the user starts or finishes the action is displayed.

Specifically, at the time set by the user as the time at which the predetermined action is to be started, as illustrated in (b) in FIG. 3, operation switch 1 turns into a start button display mode in which a start button is displayed on display screen 10a as switch button 11. In the start button display mode, in second text display area 10a2, text that prompts pressing of switch button 11 and induces the user to start the predetermined action is displayed. For example, when the user is to study as the predetermined action, as the text that prompts pressing of switch button 11 and induces the user to start studying, "Let's start!" is displayed in second text display area 10a2.

Note that, as illustrated in (b) in FIG. 3, in the start button display mode, switch button 11 displayed on display screen 10a is a start button in which circular section 11a and ring section 11b are displayed in different colors. Specifically, in switch button 11 displayed as a start button, circular section 11a is displayed in a first color, and ring section 11b is displayed in a second color different from the first color.

Moreover, when switch button 11 is displayed in the start button display mode illustrated in (b) in FIG. 3, display screen 10a is switched to a screen illustrated in (c) in FIG. 3, operation switch 1 turns into an end button display mode in which an end button is displayed as switch button 11 on display screen 10a. In the end button display mode, text that prompts pressing of switch button 11 when the user finishes the predetermined action is displayed in second text display area 10a2. For example, when the user is to study as the predetermined action, as the text that prompts pressing of switch button 11 when the user has finished studying, "Finished!" is displayed in second text display area 10a2.

Note that, as illustrated in (c) in FIG. 3, in the end button display mode, switch button 11 displayed on display screen 10a is an end button displayed in a display mode different from the start button illustrated in (b) in FIG. 3. Specifically, in switch button 11 displayed as the end button, circular section 11a is displayed in a second color and ring section 11b is displayed in a first color different from the second color. In other words, switch button 11 displayed as the end button illustrated in (c) in FIG. 3 and switch button 11 as the start button illustrated in (b) in FIG. 3 are images in which the colors of circular section 11a and ring section 11b are inverted from each other.

Accordingly, in this embodiment, a notification that prompts pressing of switch button 11 is given by displaying text on display screen 10a, but such a notification may be given by displaying an image on display screen 10a without using text. Moreover, the notifier that gives the notification that prompts pressing of switch button 11 using text is integrated with input/output section 10, but this is not limiting. The notifier may be separate from input/output section 10. In this case, the notifier that gives the notification that prompts pressing of switch button 11 may be a display separate from input/output section 10. The notifier may also be a sound outputter that outputs sound. In other words, the notification that prompts pressing of switch button 11 may be given by sound (for example, audio message). Here, loudspeaker 50 included in operation switch 1 may be used as the notifier. Moreover, the notifier that gives a notification that prompts pressing of switch button 11 may be a vibration outputter or a light outputter. In other words, the notification that prompts pressing of switch button 11 may be given by vibration or light.

Controller 20 controls operation switch 1 and controls device 2. Specifically, controller 20 causes the notifier to give the notification that prompts pressing of switch button 11 at a preset time, and operates device 2 in response to pressing of switch button 11 after the notifier gives the notification.

In this embodiment, the preset time includes a time at which the user is to start the predetermined action. In this case, controller 20 causes the notifier to give a start notification as the notification that prompts pressing of switch button 11 at a time at which the predetermined action is to be started, and operates device 2 to change the environment in the space in which device 2 is provided in response to pressing of switch button 11 after the notifier gives the start notification.

Specifically, the start notification is a notification that induces start of an action and the notifier that gives the start notification is input/output section 10. Therefore, first, controller 20 displays text that prompts pressing of switch button 11 on display screen 10a of input/output section 10 as a notification that induces start of an action at the preset time as a time at which the user is to start the predetermined action. After that, when switch button 11 is pressed, controller 20 operates device 2 to change the environment of the space in which device 2 is provided. For example, when device 2 is a lighting fixture, controller 20 controls the lighting fixture to change the lighting environment in which the lighting fixture is provided. Specifically, controller 20 dims and/or adjusts the color of the illumination light emitted from the lighting fixture.

Moreover, when switch button 11 is pressed after controller 20 causes the notifier to give the start notification as a first notification, controller 20 may further cause the notifier to give a second notification that prompts pressing of switch button 11 again. Controller 20 may operate device 2 to return the environment in the space in which device 2 is provided to the original environment in response to pressing of switch button 11 after the notifier gives the second notification.

Specifically, the second notification is a notification that induces end of an action, and therefore when switch button 11 is pressed after controller 20 displays the text that prompts pressing of switch button 11 on display screen 10a of input/output section 10 as the notification that induces start of an action (first notification), controller 20 displays the text that prompts pressing of switch button 11 again on display screen 10a of input/output section 10 as the notification that induces end of an action. After that, when switch button 11 is pressed, controller 20 operates device 2 to return the environment of the space in which device 2 is provided to the original environment. For example, when device 2 is a lighting fixture, controller 20 controls the lighting fixture to return the lighting environment (specifically, illumination environment) in which the lighting fixture is provided to the lighting environment of the space in which the lighting fixture is provided before the notification that incudes start of an action is given.

Note that controller 20 includes a processor or the like that executes a program, such as an application program. Controller 20 performs a variety of controls by executing such a program. Controller 20 may include, for example, a micro-processing unit (MPU), a central processing unit (CPU), a digital signal processor (DSP), a graphical processing unit (GPU), or a system on a chip (SOC).

Storage 30 is memory that stores a variety of information. For example, storage 30 stores an image or text to be displayed on display screen 10a. Moreover, storage 30 may store an operational log, such as a time at which switch button 11 has actually been pressed.

Storage 30 includes, for example, a primary storage device such as random-access memory (RAM) and read-only memory (ROM). Moreover, storage 30 may include a secondary storage device such as a hard disk drive (HDD) and a solid-state drive (SSD) and/or a tertiary storage device such as an optical disc and an SD card. Storage 30 is, for example, non-volatile memory but may be volatile memory. Note that storage 30 may store a variety of programs to be executed by controller 20. Moreover, storage 30 may be part of controller 20.

Communicator 40 has a function of communicating with an external device through a network. Communicator 40 is a communication adapter capable of communicating with an external device or an external system including device 2 or information processing device 3.

The communication system used by communicator 40 is, for example, a wide area network (WAN), a local area network (LAN), power line communication, infrared communication, Near Field Communication (for example, Bluetooth (registered trademark) communication), or mobile communication for mobile phones.

Loudspeaker 50 is a sound outputter that outputs sound. For example, when text that prompts pressing of switch button 11 is displayed on display screen 10a, loudspeaker 50 may output an alarm sound such as "beep, beep, beep" at the same time when the text is displayed to let the user know that the text is displayed.

Note that, operation switch 1 may output light such as flashing light while outputting an alarm sound or without outputting the alarm sound, at the same time when the text that prompts pressing of switch button 11 is displayed on display screen 10*a*. For example, the notification that induces start of an action and the notification that induces end of an action may be given together with an alarm sound and/or light.

Figure 4:
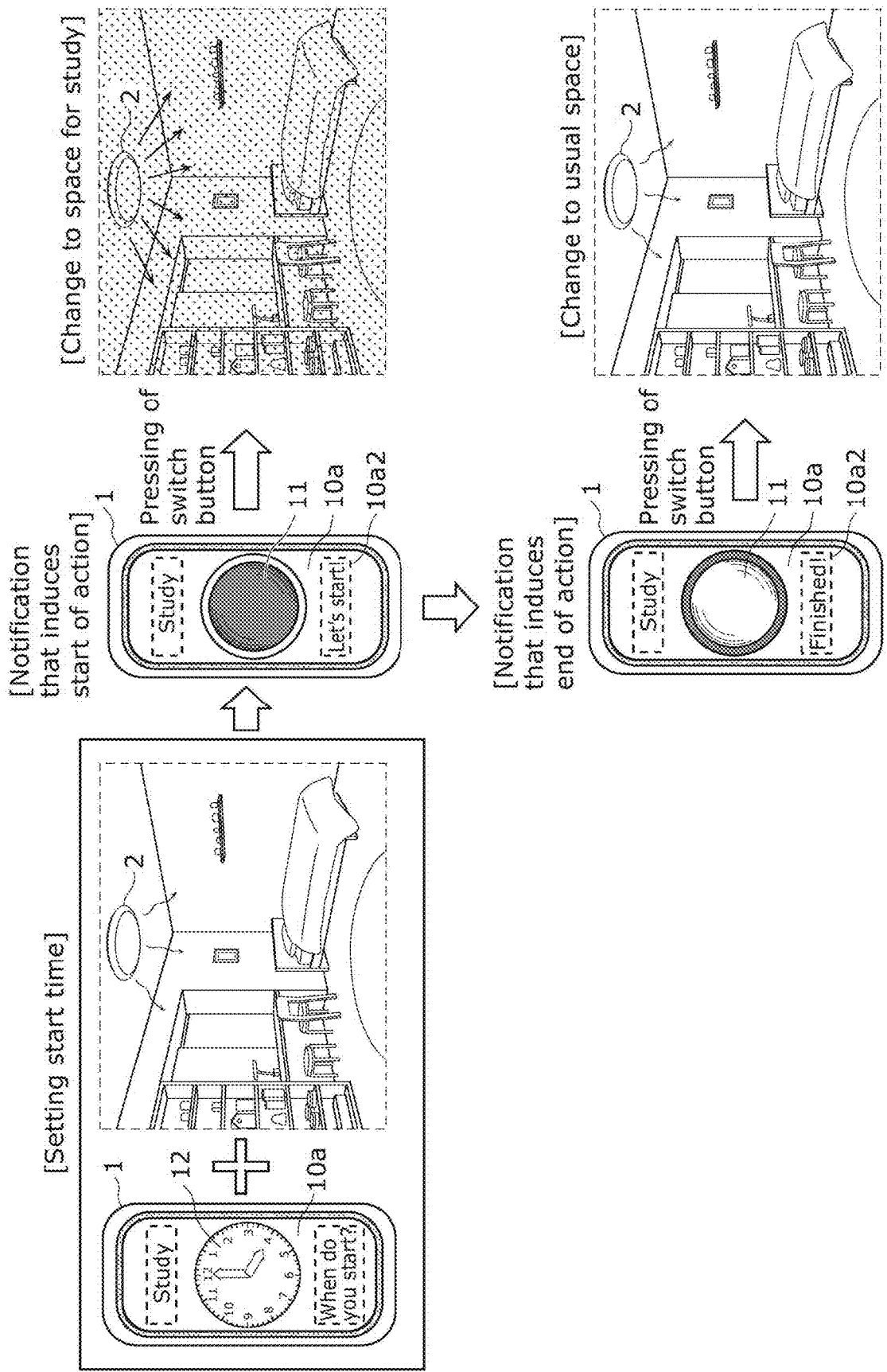
FIG. 4 is a diagram for illustrating linkage between the operation switch and a device in the device linkage system according to the embodiment.

Next, a device linkage when operation switch 1 according to this embodiment is used will be described with reference to FIG. 4 as well as FIG. 3. FIG. 4 is a diagram for illustrating linkage between operation switch 1 and device 2 in device linkage system 100 according to the embodiment. In FIG. 4, device 2 is a ceiling light provided on the ceiling of a child's room, and emits illumination light as a main function. Moreover, device 2, which is a ceiling light, has a dimming function and a toning function and can control brightness of the illumination light and the color temperature of the illumination light. Note that in FIG. 4, dot hatching is applied for descriptive purposes to show the difference between lighting environments of the child's room.

In this embodiment, a case where the user studies as the predetermined action will be described. In this case, first, as illustrated in FIG. 4, a time at which study is to be started is set using operation switch 1. Specifically, as illustrated (a) in FIG. 3, the user moves the hour hand and the minute hand of clock 12 displayed on display screen 10*a* of operation switch 1 by touch operation to set the time at which the user wishes to start studying.

Note that clock 12 does not need to be displayed as an analog clock, and may be displayed as a digital clock. When clock 12 is displayed as a digital clock, the time at which the user wishes to start studying can be set by changing the "hour" and the "minute" of clock 12 displayed. Moreover, setting the time on operation switch 1 does not need to be performed on operation switch 1 and may be performed through an external device, such as information processing device 3.

After that, at the time that is set, the image illustrated in (b) in FIG. 3 is displayed on display screen 10*a* of operation switch 1. In other words, controller 20 of operation switch 1 displays text that prompts pressing of switch button 11 on display screen 10*a*, as a notification that induces start of an action. Specifically, as the text that prompts pressing of switch button 11 and induces start of studying, "Let's start!" is displayed in second text display area 10*a*2 on display screen 10*a*.

After that, as illustrated in FIG. 4, when the user presses switch button 11 displayed on display screen 10*a*, controller 20 of operation switch 1 operates device 2 to change the environment of the space in which device 2 is provided. Specifically, when the user presses switch button 11, a control signal that controls device 2 is transmitted from controller 20 to device 2 and device 2 operates, and the environment of the space in which device 2 is provided changes. In this embodiment, since device 2 is a ceiling light, when the user presses switch button 11, the lighting environment in which the ceiling light is provided changes. For example, the brightness and the color temperature of light emitted from the ceiling light is controlled to make the lighting environment of the room suitable for study. In other words, the room in which the ceiling light is provided changes to a space for study. With this, the user feels the lighting atmosphere of the room has changed and can switch his/her frame of mind. Note that the brightness and the color temperature of the illumination light of the ceiling light suitable for study may be set in advance, or may be adjusted each time based on the lighting environment of the room.

Note that when the ceiling light is off before the user presses switch button 11, the ceiling light is turned on by pressing of switch button 11, and then illumination light suitable for study is emitted from the ceiling light.

Moreover, when the user presses switch button 11 after the text "Let's start!" is displayed on display screen 10*a*, the notification that induces an action is turned off at the same time when the operation of device 2 is turned on, and display screen 10*a* of operation switch 1 switches. Specifically, when the user presses switch button 11, the image illustrated in (c) in FIG. 3 is displayed on display screen 10*a*. In other words, controller 20 of operation switch 1 displays text that prompts pressing of switch button 11 again on display screen 10*a*, as the notification that induces end of an action. In this embodiment, the text "Finished!" is displayed in second text display area 10*a*2 on display screen 10*a*, as the text that prompts pressing of switch button 11 when the user has finished studying.

After that, as illustrated in FIG. 4, when the user presses switch button 11 displayed on display screen 10*a* after the user has finished studying, controller 20 of operation switch 1 operates device 2 to change the environment of the space in which device 2 is provided. Specifically, when the user presses switch button 11, a control signal that controls device 2 is transmitted from controller 20 to device 2 and device 2 operates, and the environment of the space in which device 2 is provided changes. In this embodiment, since device 2 is a ceiling light, when the user presses switch button 11, the lighting environment in which the ceiling light is provided changes to return to the original lighting environment. For example, the brightness and the color temperature of the light emitted from the ceiling light are controlled to change the lighting environment of the room to the lighting environment before studying. In other words, the room in which the ceiling light is provided changes into a usual space (living space).

Accordingly, with device linkage system 100 according to the present embodiment, a housing space can be switched to a suitable environment by operating operation switch 1.

As described above, operation switch 1 according to this embodiment includes: switch button 11 to be pressed by a user; and controller 20 that causes a notifier to give a notification that prompts pressing of switch button 11 at a preset time, and operates device 2 in response to pressing of switch button 11 after the notifier gives the notification.

This configuration makes it possible to prompt the user to operate device 2 at the time set by the user so that the user voluntarily operates device 2 to cause device 2 to start operating. Specifically, at the time set by the user, the notification that prompts pressing of switch button 11 is given and prompts the user to operate device 2. When the user actually presses switch button 11 after the notification is given, device 2 will be operated by operation switch 1 and device 2 will start the predetermined operation. In other words, if the user does not actually press switch button 11 even at the time set by the user, operation of device 2 will not be started. Accordingly, in operation switch 1 according to this embodiment, pressing of switch button 11 by the user causes device 2 to start operating. Therefore, actions of the user can be known by obtaining the operational log of operation switch 1.

Furthermore, in operation switch 1 according to this embodiment, operation of device 2 is started only after the user presses switch button 11, and thus it is easy to prompt the user to start or continue an action. Specifically, use of operation switch 1 enables a child to develop the ability to voluntarily take action (to be proactive). In other words, operation switch 1 is effective as an operation terminal for supporting parenting.

Moreover, in this embodiment, the time preset using operation switch 1 includes a time at which the user is to start a predetermined action. Controller 20 of operation switch 1 causes the notifier to give a start notification as the notification at a time at which the predetermined action is to be started, and operates device 2 to change an environment of a space in which device 2 is provided in response to pressing of switch button 11 after the notifier gives the start notification.

Accordingly, the environment of the space in which device 2 is provided is changed when the user presses switch button 11 after being prompted to start the predetermined action. This enables the user to easily switch his/her frame of mind and start the predetermined action. For example, the user can easily switch his/her frame of mind to a concentrated frame of mind with respect to the predetermined action, and thus the user is likely to start the predetermined action.

Moreover, in operation switch 1 according to this embodiment, when switch button 11 is pressed after controller 20 causes the notifier to give the start notification as a first notification (notification that induces start of an action in this embodiment), controller 20 causes the notifier to give a second notification that prompts pressing of switch button 11 again (notification that induces end of an action in this embodiment), and operates device 2 to return the environment of the space in which device 2 is provided to an original environment in response to pressing of switch button 11 after the notifier gives the second notification.

With this configuration, when switch button 11 is pressed after the user has finished the predetermined action, the environment of the space in which device 2 is provided returns to the original environment. With this, the user can easily switch his/her frame of mind. For example, the user can easily switch from a concentrated frame of mind to a relaxed frame of mind with respect to the predetermined action.

Moreover, in operation switch 1 according to this embodiment, switch button 11 is an image, and switch button 11 when the notification that induces start of an action (first notification) is given and switch button 11 when the notification that induces end of an action (second notification) is given are displayed in different display modes.

With this configuration, the user can easily visually determine whether operation switch 1 gives the notification that induces start of an action or the notification that induces end of an action by seeing the display mode of switch button 11 without seeing the text that is displayed in second text display area 10a2 and prompts pressing of switch button 11.

Moreover, operation switch 1 according to this embodiment includes input/output section 10 as an input section for inputting a time at which the notification that prompts pressing of switch button 11 is to be given.

With this configuration, the time at which the notification that prompts pressing of switch button 11 is given can be easily set by operating operation switch 1. Note that the time may be input other than by using operation switch 1 alone. Time data set using an external device, such as information processing device 3, may be transferred to operation switch 1.

Moreover, operation switch 1 according to the present embodiment successively stores the operational log of operation switch 1 performed by the user in storage 30 as an action log (lifelog) of the user. For example, the operational log including the following information is stored as an action log of the user in storage 30: (i) The name of the predetermined action performed by the user (for example, "study"), (ii) the time, year, month, and date that are preset and at which the user is to start the predetermined action, and (iii) the time at which switch button 11 has been pressed by the user and what operation has been performed when operation switch 1 has operated device 2. In other words, the action log linked to the operational log of operation switch 1 is stored in storage 30.

Figure 5:
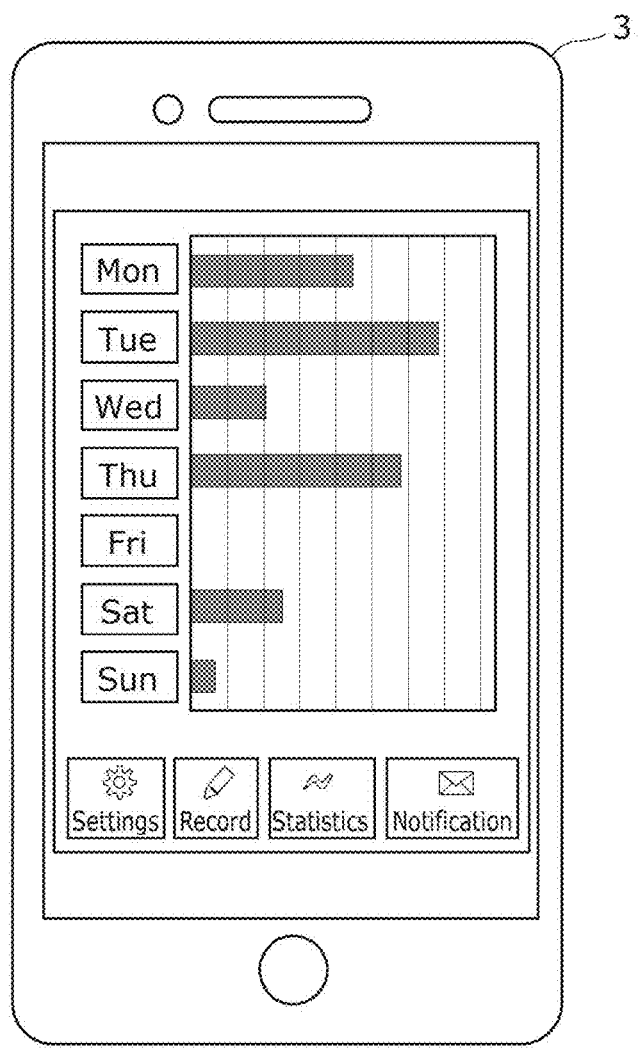
FIG. 5 is a diagram illustrating an example of a display on the screen of an information processing device in the device linkage system according to the embodiment.

As illustrated in FIG. 5, the action log stored in storage 30 can be seen on information processing device 3 using an application, for example. In other words, the action log of the user can be visualized. In this case, the action log may be stored also in information processing device 3. In other words, the action log may be recorded and accumulated not only by using operation switch 1 alone, but also recorded and accumulated in information processing device 3, which is an external device, by transferring the action log to information processing device 3. Alternatively, the action log may be recorded and accumulated in a cloud server capable of communicating with operation switch 1 through a network by transferring the action log to the cloud server.

Accordingly, the actions of the user can be easily known by recording the action log of the user linked to the operational log of operation switch 1 can be obtained. Moreover, analyzing the execution data of the action log by an artificial intelligence (AI) technology can also visualize the degree of interest of a user, such as a child.

Moreover, device 2 may be configured to switch the main function between on and off in response to pressing of switch button 11 of operation switch 1. In this case, storage 30 of operation switch 1 may store a time at which the main function of device 2 has been turned on and a time at which the main function of device 2 has been turned off.

With this, the operation of turning on device 2 and the operation of turning off device 2 by operation switch 1 can be respectively replaced with start and end of an action of the user and stored. In other words, the operation of turning on device 2 and the operation of turning off device 2 by operation switch 1 can be respectively associated with start and end of an action of the user and linked to each other.

Figure 6:
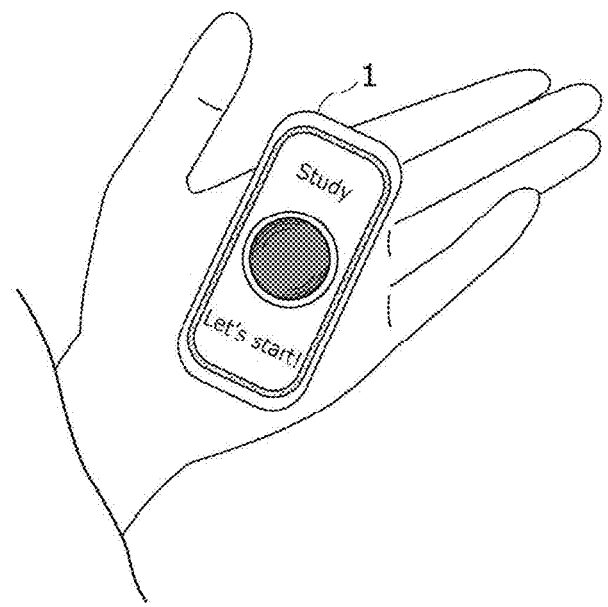
FIG. 6 is a diagram illustrating an exemplary use of the operation switch according to the embodiment.
Figure 7:
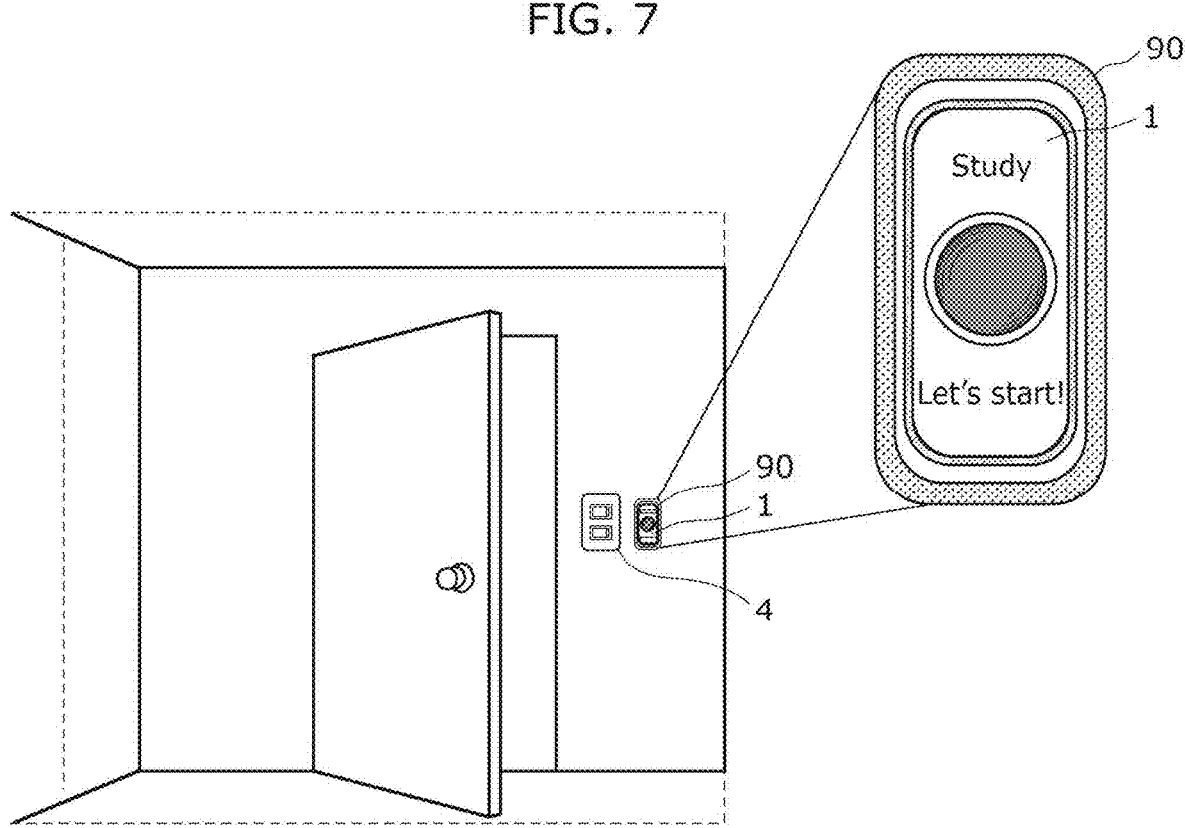
FIG. 7 is a diagram illustrating another exemplary use of the operation switch according to the embodiment.

Moreover, operation switch 1 having such a configuration may be used as a remote switch as illustrated in FIG. 6, or may be used as a detachable wall-mounted switch as illustrated in FIG. 7.

When operation switch 1 is used as a wall-mounted switch, operation switch 1 may include adapter 90 that is mounted for holding operation switch 1 on a wall as illustrated in FIG. 7. Adapter 90 that is mounted for holding operation switch 1 on a wall is attached near wall switch 4, for example, in the vicinity of wall switch 4 provided on the wall near the door of a room. For example, adapter 90 that is mounted on a wall may be attached within the reach of a child. As described above, use of operation switch 1 as a wall-mounted switch makes it possible to provide operation switch 1 on a place where the user, such as a child, can easily operate operation switch 1, according to the height of the user.

Moreover, in this embodiment, device 2 is described as having only one main function as the operation specification, but this is not limiting. In other words, device 2 may include one main function and one or more auxiliary functions as a plurality of operation specifications. In this case, controller 20 of operation switch 1 may call up the plurality of operation specifications from device 2 and cause device 2 to operate based on any one of the plurality of operation specifications selected by the user.

Figure 8:
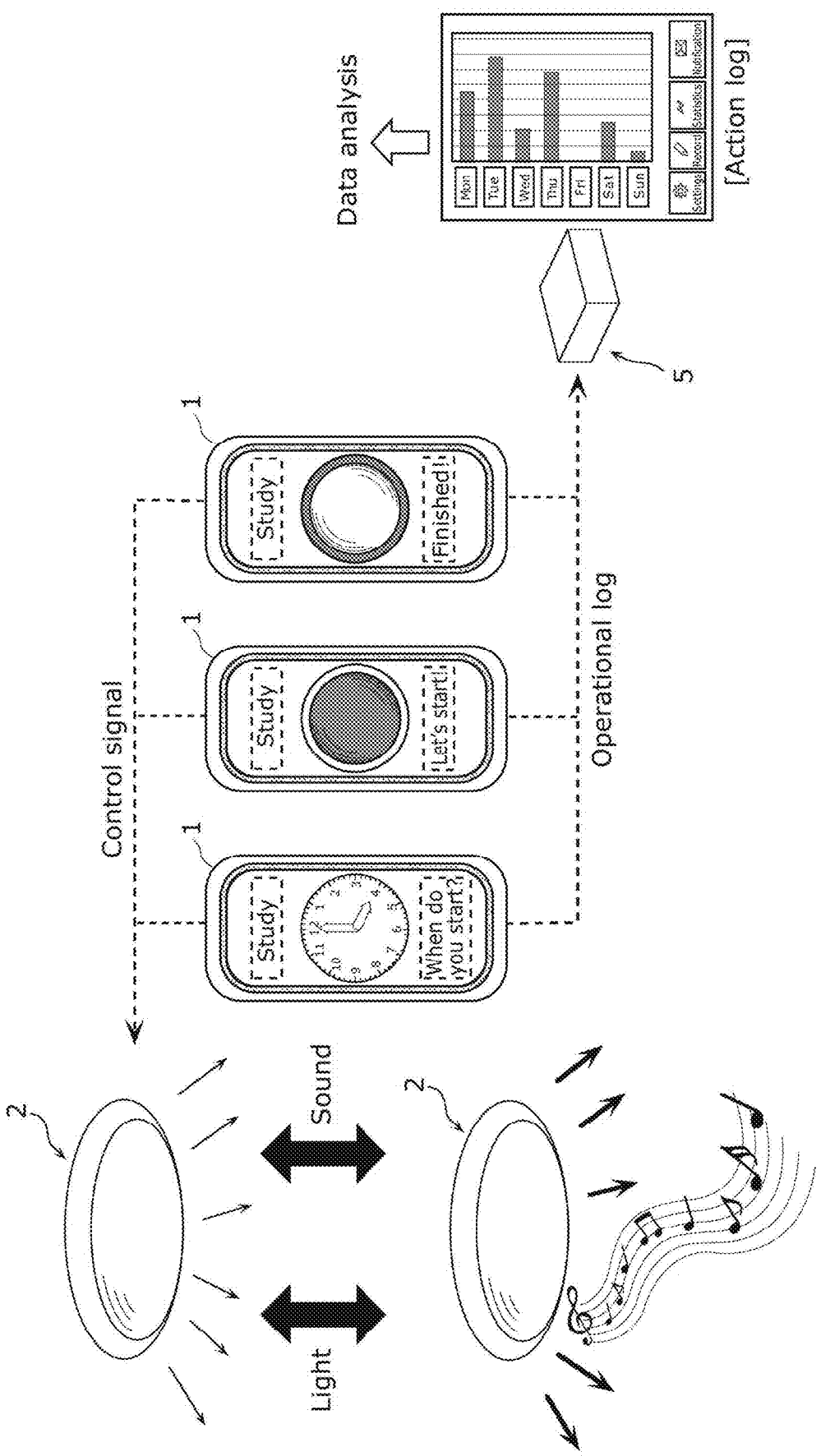
FIG. 8 is a diagram illustrating a variation of the device linkage system according to the embodiment.

Specifically, in this embodiment, an example of device 2 is described as a lighting fixture having only a function of emitting illumination light as the main function. However, a lighting fixture having a loudspeaker may be used as device 2, as illustrated in FIG. 8. The lighting fixture having a loudspeaker not only emits illumination light as a main function, but also outputs sound as an auxiliary function. As an example, device 2 is a ceiling light including a loudspeaker.

Accordingly, use of a lighting fixture that outputs light and sound as device 2 makes it possible to change the environment of a space by light and music when operation switch 1 causes device 2 to operate. Note that the operational log of operation switch 1 may be transmitted to information processing device 5 and the data may be analyzed.

Moreover, in this embodiment, a single operation switch 1 and a single device 2 are linked to each other, but this is not limiting. For example, a single operation switch 1 and a plurality of devices 2 may be linked to each other. In this case, as illustrated in FIG. 9, operation switch 1 and the plurality of devices 2 may be linked through home automation (HA).

With this, scenes of a space can be set through home automation, and the scenes can be switched by operating operation switch 1. Therefore, a space suitable for an action of the user can be created.

Figure 9:
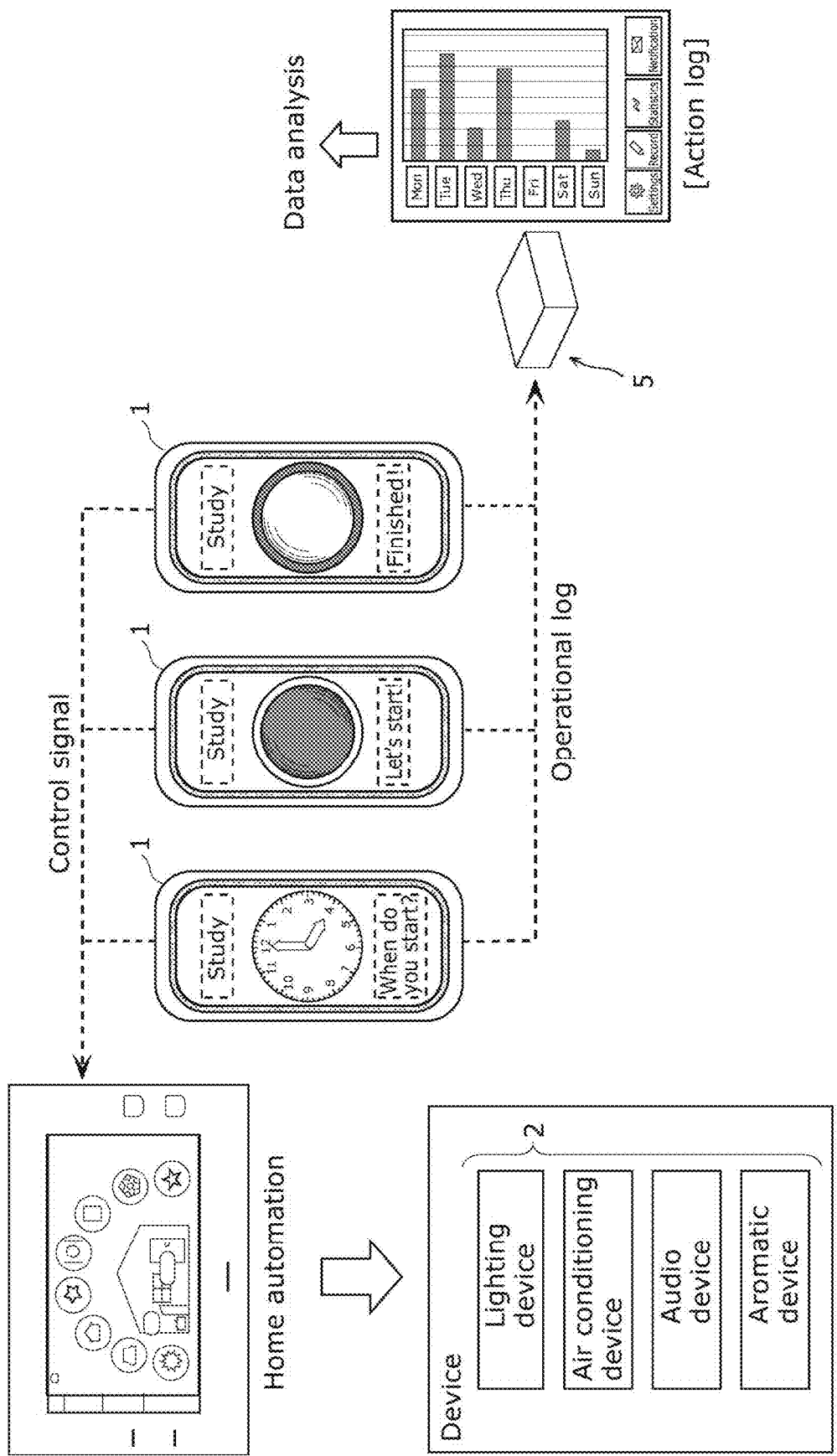
FIG. 9 is a diagram illustrating another aspect of the device linkage system according to the embodiment.

Moreover, when a plurality of devices 2 are used, as illustrated in FIG. 9, a plurality of devices 2 each having a different main function may be used. For example, a lighting device, an air conditioning device, an audio device, and an aromatic device may be used as the plurality of devices 2. The light environment can be changed when the lighting device operates by being operated by operation switch 1. Moreover, the temperature environment can be changed when the air conditioning device operates by being operated by operation switch 1. Moreover, the sound environment can be changed when the audio device operates by being operated by operation switch 1. Moreover, the odor environment can be changed when the aromatic device is caused to operate by being operated by operation switch 1. Accordingly, use of a plurality of devices 2 each having a different main function makes it possible to further set a plurality of types of scenes of a space by home automation. Therefore, the space suitable for an action of the user can be further created.

[Variations]

The present invention has been described above based on the embodiment above, but the present invention should not be limited to the embodiment.

For example, in this embodiment, the notifier that gives the notification that prompts pressing of switch button 11 is included in operation switch 1, but this is not limiting. For example, the notifier that gives the notification that prompts pressing of switch button 11 may be included in device 2 or a device (second device) different from device 2 (first device). When device 2 includes the notifier, controller 20 of operation switch 1 causes the notifier of device 2 to give the notification that prompts pressing of switch button 11. In contrast, when a device different from device 2 includes the notifier, controller 20 of operation switch 1 causes the notifier of the different device to give the notification that prompts pressing of switch button 11.

Including the notifier in a different device from device 2 enables the user to receive the notification that prompts pressing of switch button 11 by providing the different device including the notifier in a different space from the space in which device 2 is provided as long as the user is in the different space, even when the user is not present in the space in which device 2 is provided.

For example, as illustrated in FIG. 10, when a ceiling light is provided in a child's room as first device 2a that changes the lighting environment of the room and a ceiling light that is second device 2b including the notifier is provided in a living room, a user (for example, a child) who is to perform a predetermined action using operation switch 1 can receive the notification that prompts pressing of switch button 11 by being in the living room. In this case, controller 20 of operation switch 1 causes the notifier included in the ceiling light that is second device 2b to give the notification that prompts pressing of switch button 11 (notification that induces start of an action). This prompts the user in the living room to start the predetermined action (for example, study). Here, when the user presses switch button 11 of operation switch 1 in the living room, the ceiling light (first device 2a) in the child's room is remotely controlled through operation of operation switch 1 and the lighting environment of the child's room can be changed. Note that when switch button 11 of operation switch 1 is pressed as a result of giving the notification that induces start of an action, display screen 10a of operation switch 1 displays the notification that induces end of an action. After that, when switch button 11 is pressed again, the ceiling light in the child's room operates to change the lighting environment of the child's room to the original lighting environment.

Moreover, in the above embodiment, the predetermined action to be performed by the user is studying, but this is not limiting. For example, the predetermined action to be performed by the user may be, sleeping, eating a meal, taking a bath, going out, and so on. Moreover, operation switch 1 may be configured to support such predetermined actions. In this case, controller 20 of operation switch 1 operates device 2 in accordance with an action selected from among the predetermined actions.

Moreover, as illustrated in FIG. 11, operation switches 1 each corresponding to a different one of the predetermined actions may be prepared, and each operation switch 1 may be provided in a place related to an action. For example, when the action of the user is sleeping, operation switch 1A may be provided in a bedroom. When the action of the user is eating a meal, operation switch 1B may be provided in a dining room. When the action of the user is playing outside, operation switch 1C may be provided in an entrance hall. As described above, operation switches 1A, 1B, and 1C provided in a plurality of places may be operated by one user. With this, the action log of one user linked to operational log of the one user can be obtained by the operation switch provided in each place. Therefore, a planned start time of an action, an actual start time of the action, and an actual end time of the action with respect to one user can be easily obtained, and the daily activity pattern of the user can be known. Accordingly, the life pattern of the user can be known by obtaining and accumulating the operational log of operation switch 1 provided with respect to each living activity. Note that a plurality of operation switches 1 may be additionally provided for each user.

Note that, other than the above, the present invention also includes embodiments as a result of adding various modifications that may be conceived by those skilled in the art to the embodiment, or embodiments obtained by combining structural elements and functions in the embodiment in any manner without departing from the scope of the present invention.

Moreover, in the above description, a variety of controllers included in operation switch 1 and device linkage system 100, such as controller 20, each may be a circuit. These circuits may constitute one circuit as a whole, or each circuit may be a separate circuit. Moreover, each of these circuits may be a general-purpose circuit or a dedicated circuit.

Moreover, the method performed in device linkage system 100 may be implemented as a program for causing a computer to execute the method, or may be implemented as a computer-readable recording medium having such a program recorded thereon.

REFERENCE SIGNS LIST 1, 1A, 1B, 1C operation switch
2 device
2a first device
2b second device
3, 5 information processing device
4 wall switch
10 input/output section
10a display screen
10a1 first text display area
10a2 second text display area
11 switch button
11a circular section
11b ring section
12 clock
20 controller
30 storage
40 communicator
50 loudspeaker
90 adapter
100 device linkage system

The invention claimed is:

1. An operation switch for operating a first device, the operation switch comprising:
 a switch button to be pressed by a user; and
 a controller that causes a notifier to give a notification that prompts pressing of the switch button at a preset time, and operates the first device in response to pressing of the switch button after the notifier gives the notification, wherein
 the preset time includes a time at which the user is to start a predetermined action,
 the controller causes the notifier to give a start notification as the notification at a time at which the predetermined action is to be started, and operates the first device to change an environment of a space in which the first device is provided in response to the pressing of the switch button after the notifier gives the start notification, and
 when the switch button is pressed after the controller causes the notifier to give the start notification as a first notification, the controller causes the notifier to give a second notification that prompts pressing of the switch button again, and operates the first device to return the environment of the space in which the first device is provided to an original environment in response to pressing of the switch button after the notifier gives the second notification.

2. The operation switch according to claim 1, wherein the switch button is an image, and
 the switch button when the first notification is given and the switch button when the second notification is given are displayed in different display modes.

3. The operation switch according to claim 1, wherein the operation switch includes the notifier.

4. The operation switch according to claim 1, wherein the controller causes the notifier included in a second device to give the notification, the second device being different from the first device.

5. The operation switch according to claim 4, wherein the second device is provided in a space different from the space in which the first device is provided.

6. The operation switch according to claim 1, comprising:
 an input section for inputting a time at which the notification is to be given.

7. The operation switch according to claim 1, comprising:
 a storage that stores a time at which the switch button has been pressed.

8. The operation switch according to claim 7, wherein
 a main function of the first device is switched between on and off in response to pressing of the switch button, and
 the storage stores a time at which the main function of the first device has been turned on and a time at which the main function of the first device has been turned off.

9. The operation switch according to claim 1, wherein
 the first device includes a plurality of operation specifications, and
 the controller calls up the plurality of operation specifications and causes the first device to operate based on any one of the plurality of operation specifications selected by the user.

10. The operation switch according to claim 1, wherein the controller operates the first device in accordance with an action selected from among predetermined actions to be performed by the user.

11. The operation switch according to claim 1, comprising:
 an adapter that is mounted for holding the operation switch on a wall.

12. A device linkage system comprising:
 a first device provided in a predetermined space; and
 an operation switch that operates the first device, wherein the operation switch includes:
  a switch button to be pressed by a user; and
  a controller that causes a notifier to give a notification that prompts pressing of the switch button at a preset time, and operates the first device to change an environment of the predetermined space in response to pressing of the switch button after the notifier gives the notification,
 the preset time includes a time at which the user is to start a predetermined action,
 the controller causes the notifier to give a start notification as the notification at a time at which the predetermined action is to be started, and operates the first device to change an environment of a space in which the first device is provided in response to the pressing of the switch button after the notifier gives the start notification, and
 when the switch button is pressed after the controller causes the notifier to give the start notification as a first notification, the controller causes the notifier to give a second notification that prompts pressing of the switch button again, and operates the first device to return the environment of the space in which the first device is provided to an original environment in response to pressing of the switch button after the notifier gives the second notification.

* * * * *